Apr. 17, 1923.
C. E. WHITE
BEET PULLER
Filed May 5, 1919
1,451,725
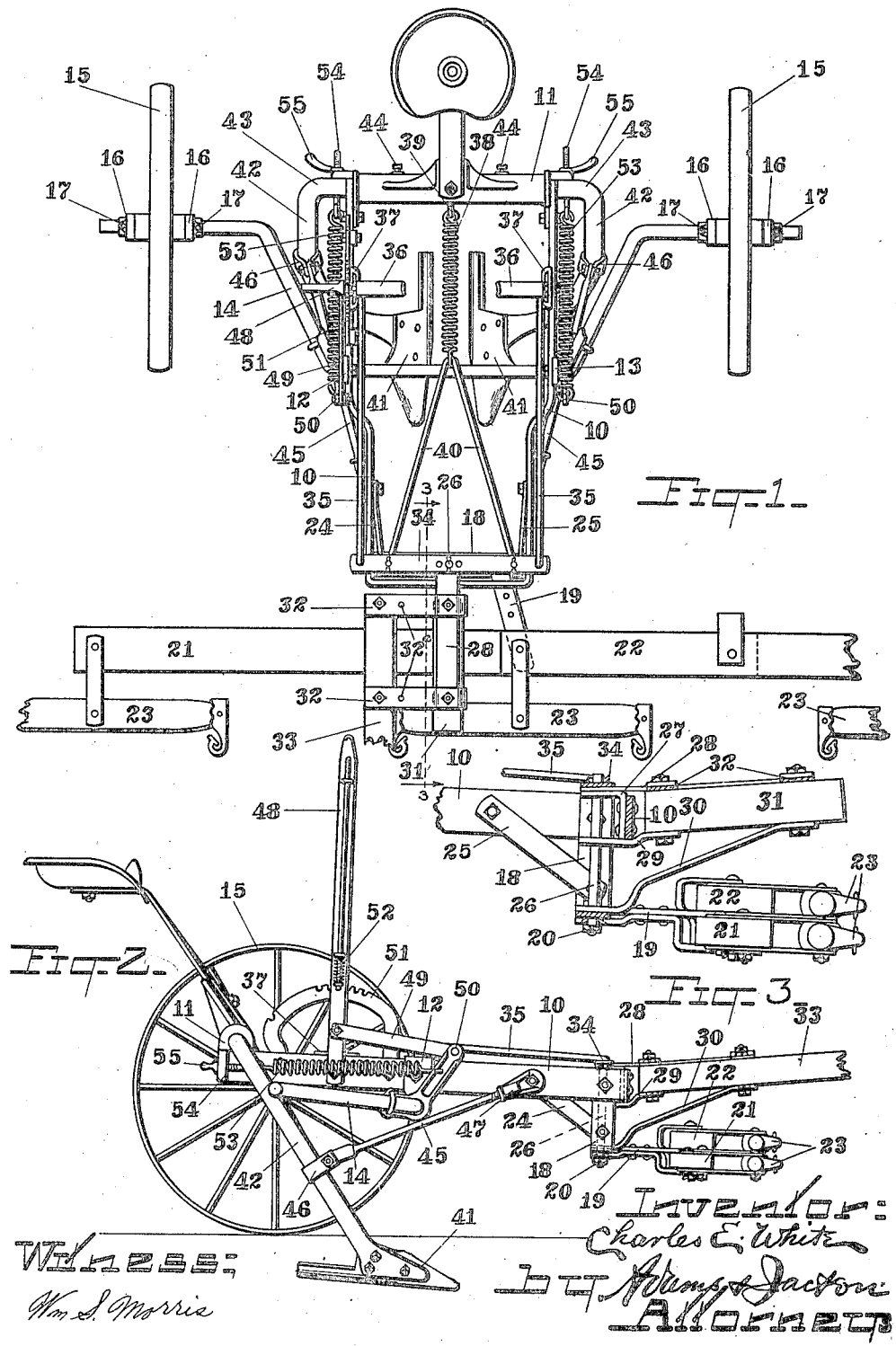

Patented Apr. 17, 1923.

1,451,725

UNITED STATES PATENT OFFICE.

CHARLES E. WHITE, OF MOLINE, ILLINOIS, ASSIGNOR TO DEERE & COMPANY, OF MOLINE, ILLINOIS, A CORPORATION OF ILLINOIS.

BEET PULLER.

Application filed May 5, 1919. Serial No. 294,634.

*To all whom it may concern:*

Be it known that I, CHARLES E. WHITE, a citizen of the United States, and a resident of Moline, in the county of Rock Island and State of Illinois, have invented certain new and useful Improvements in Beet Pullers, of which the following is a specification, reference being had to the accompanying drawings.

This invention relates to improvements in that type of agricultural implements generally known as "beet pullers".

In the particular embodiment of my invention as illustrated in the drawings, the machine is not equipped with the ordinary type of earth engaging elements adapted to force the beets out of the ground, but is equipped rather with an improved type of blades adapted to loosen the beets so as to render them capable of being removed easily by hand. It is the principal object of my invention to provide an agricultural machine of this general type with means for normally holding the two blades that operate at opposite sides of a row of beets parallel to the line of advance of the draft team without requiring effort on the part of the operator, and at the same time so construct the machine as to permit the operator to quickly move such blades in order that they may follow any irregularities in the plant row. These objects I accomplish as illustrated in the drawings and hereinafter particularly described. That which I believe to be new will be set forth in the claims.

In the drawings,—

Fig. 1 is a plan view of a machine embodying my improvements;

Fig. 2 is a side elevation of the machine;

Fig. 3 is a cross-section taken at line 3—3 of Fig. 1.

Referring to the several figures of the drawings, 10 and 11 indicate the main frame of the machine, the part 10 being shown as a bar bent into substantially U-shape and 11 a hollow rear cross-member that connects the ends of the part 10 together. 12 and 13 indicate brackets at opposite sides of the frame member 10 in which is journaled a crank axle 14 upon the spindle end portions of which are journaled wheels 15 each held in any desired position on its spindle by collars 16 secured in place by set screws 17. Secured to the forward part of the frame and depending therefrom is a draft member 18 to which a clevis 19 is attached by means of a bolt 20. 21—22 indicate equalizing bars carrying draft attachments 23. 24—25 indicate braces extending from the side bars of the main frame to the draft member 18 for holding such draft member rigidly in place. As usual, provision is made for shifting the clevis 19 and its bolt 20 transversely of the draft member so as to attain the proper hitch for the conditions that prevail in the field where the machine is to be operated. 26 indicates a long pivot pin located opposite the longitudinal center of the machine. Its lower end portion engages the draft member 18 and its upper end portion engages a bracket 27 (see Fig. 3) secured to the rear face of the transverse front portion of the main frame member 10. Pivoted upon the pin 26 are tongue connections 28, 29 and 30, to which is to be bolted a stub tongue 31—the connection 30 which extends diagonally upward from the pin 26 acting as a brace to prevent the frame and tongue sagging at the joint. 32—32 indicate bars that extend laterally from the stub tongue 31 and to these bars is bolted, or otherwise secured, the main tongue 33 which at its forward end has the usual neck-yoke means for attachment to the draft arms. The bars 32 are provided with extra holes 32ª which in some instances may be used as the location for the main tongue 33 to properly position the draft animals relative to the plant rows. Also it may be noted that in some instances it may be desirable to locate the main tongue on the side of the stub tongue other than that shown in Fig. 1 in which event the construction here shown lends itself readily to such change,—it being understood that when the main tongue is changed over in such manner the clevis 19 will also be shifted along the member 18 to bring the draft hitch to the right point. 35—35 indicate two links pivotally connected at their forward ends respectively to opposite ends of a cross-bar 34 that is securely affixed to the rear portion of the tongue connection 28, and through the central portion of which the pivot pin 26 projects and is held in place as shown in Fig. 1 by a suitable cotter. The rear end of each link is pivotally connected with a foot lever 36, each foot lever being pivotally mounted upon a bracket 37 secured to one of the side bars of the frame member 10.

In the construction shown, when the operator presses one of the foot levers 36 forwardly the motion imparted thereby through its attached link 35 will swing the bar 34 and the tongue connection 28 about the pivot pin 26, the other foot lever rocking rearwardly at that time of course. Now, as the neck-yoke attached to the draft animals prevents the point of the tongue from swinging laterally the pivot 26 will be moved laterally causing the main frame and the tongue to assume an angle relative to each other. By means of these foot levers, therefore, it will be seen that the operator can quickly and easily swerve the machine from one side to the other so as to allow the blades that operate at each side of the row of plants to follow irregularities in such rows, and that such swinging action is wholly independent of any assistance in that respect derived from the team. The means thus described for swerving the machine laterally in either direction by pressure on the foot levers is not of my invention, but I have added thereto a feature which makes the work of the operator much easier, such added improvement having to do with means for normally holding the frame and the draft elements in proper relative position for straightaway work. Even though the row being operated upon be quite a straight one it will be evident that owing to irregularities in the surface of the ground there will always be more or less tendency, owing to the pivotal connection between the tongue and the main frame, for the machine to run a little out of direct line either to one side or the other, and unless such sidewise tendency were prevented the result would be to cut or bruise many of the beets in the row being acted upon. This tendency can be and has been counteracted by the operator keeping an even pressure on the two foot levers 36, but keeping such constant and even pressure is fatiguing, and to avoid the necessity of such constant attention on the part of the operator I have provided a strong coiled spring 38 connected at its rear end by a hook 39 to the rear cross-bar 11 of the frame and acting evenly upon opposite end portions of the bar 34 that is centrally pivoted upon the long vertical pin 26. The pull of the spring upon the bar 34 is transmitted in the construction shown through a device in the form of a rod 40 bent into V form, the spring being attached to the middle of the rod and the ends of such rod being properly secured to the bar 34 at equal distances from the pivot pin 26. The power of the spring being applied in this way holds the bar 34 parallel with the rear cross-bar 11 of the frame so that the machine will move normally in a straight forward direction and yet will readily yield when the operator has occasion to divert the course of the machine to one side or the other by pressure applied to one of the foot levers 36, as above described. Two beet-loosening devices 41 are mounted in spaced relation upon the framework so as to operate at opposite sides of a row of beets. Each device 41 is secured to the lower end of a forwardly, downwardly and inwardly inclined beam 42, the upper portion of the beam being bent at right angles to form a part 43 that is adjustably secured in one end of the hollow cross-bar 11, being secured in any desired adjusted position by means of a set bolt 44. Each beam is connected with the adjacent side bar of the frame by a rod 45, the rear end of which is connected with a clip 46 that encircles the beam and the forward end of which is screw-threaded into a socket 47 secured upon the outer face of such side bar. By means of these screw-threaded rods 45 the beams 42 may be braced and held in any desired inclined position.

48 indicates a hand lever pivoted at its lower end to one of the side bars of the main frame and connected by a link 49 with one of a pair of arms 50 rigidly secured to the central portion of the crank axle 14. A notched segment 51 is secured to the frame adjacent to the hand lever, the hand lever carrying a spring latch 52, as usual, for engaging with any one of the notches of the segment, and, as will be understood, by a stroke of the lever in one direction or the other the frame can be raised or lowered and locked in any desired position. 53 indicate two coiled springs each secured at its front end to one of the arms 50 and at its rear end it is adjustably connected with the hollow cross-bar member 11 of the frame, such connection, in the construction shown, being by means of threaded bolts 54 and turn buttons 55. These springs 53 balance the weight of the frame and the operator and assist in raising the frame and attached parts.

Each of the blades 41 by which the earth is loosened about the beets so as to make the beets easily removable from the ground by hand comprises a body portion in the form of a flat plate, the front edge of which is inclined downwardly to a point that readily penetrates the soil. Rearwardly-extending runners carried by the two blades 41 on opposite sides of the beet act to hold the beet in slightly raised position after the body of the blade has passed the beet so as to permit the dirt to settle slightly about the beet without forcing it entirely out of the ground. No claim is made in this application to my improved form of blade inasmuch as this forms the subject-matter of a divisional application filed by me.

What I claim as my invention and desire to secure by Letters Patent, is—

1. In an agricultural implement, the combination of a wheel-supported frame, earth-engaging devices depending from the frame, a tongue pivotally connected with the front portion of the frame, means connected with the tongue and operable by the driver from his seat for applying lateral pressure to the pivotal connection of the tongue to divert the machine from a direct line of travel, and means connected with the tongue and frame normally tending to hold the frame against lateral turning.

2. In an agricultural implement, the combination of a wheel-supported frame, earth-engaging devices depending from the frame, a tongue pivotally connected with the front portion of the frame, means connected with the tongue and operable by the driver from his seat for applying lateral pressure to the pivotal connection of the tongue to divert the machine from a direct line of travel, and yielding means connected with the tongue and frame normally tending to hold the frame against lateral turning.

3. In an agricultural implement, the combination of a wheel-supported frame, earth-engaging devices depending from the frame, a vertical pivot at the forward end of the frame, a tongue mounted on said vertical pivot, means operable by the driver from his seat for applying lateral pressure to said pivot for causing a change in the direction of movement of the machine, and means connected with the tongue and frame normally tending to hold the tongue and frame in alinement.

4. In an agricultural implement, the combination of a wheel-supported frame, earth-engaging devices depending from the frame, a vertical pivot at the forward end of the frame, a tongue mounted on said vertical pivot, means operable by the driver from his seat for applying lateral pressure to either side of said pivot for causing a change in the direction of movement of the machine, and means connected with the tongue and frame normally tending to hold the tongue and frame in alinement.

5. In an agricultural implement, the combination of a wheel-supported frame, earth-engaging devices depending from the frame, means for raising and lowering the frame and the said devices connected therewith, a vertical pivot at the forward end of the frame, a tongue mounted on said vertical pivot, means operable by the driver from his seat for applying lateral pressure to said pivot for causing a change in the direction of movement of the machine, and means connected with the tongue and frame normally tending to hold the tongue and frame in alinement.

6. In an agricultural implement, the combination of a wheel-supported frame, earth-engaging devices depending from the frame, a vertical pivot at the forward end of the frame, a tongue mounted on said pivot, a cross-bar fixedly connected with the tongue and movably mounted on said pivot, links extending rearwardly from opposite end portions of said cross-bar, said cross-bar and links constituting means for the driver to apply lateral pressure to said pivot for causing a change in the direction of movement of the machine, and means connecting the said cross-bar and the frame and acting to normally hold the frame against lateral turning.

7. In an agricultural implement, the combination of a wheel-supported frame, earth-engaging devices depending from the frame, a vertical pivot at the forward end of the frame, a tongue mounted on said pivot, a cross-bar fixedly connected with the tongue and movably mounted on said pivot, links extending rearwardly from opposite end portions of said cross-bar, said cross-bar and links constituting means for the driver to apply lateral pressure to said pivot for causing a change in the direction of movement of the machine, and yielding means connecting the said cross-bar and the frame and acting to normally hold the frame against lateral turning.

8. In an agricultural implement, the combination of a wheel-supported frame, earth-engaging devices depending from the frame, a vertical pivot at the forward end of the frame, a tongue mounted on said pivot, a cross-bar fixedly connected with the tongue and movably mounted on said pivot, links extending rearwardly from opposite end portions of said cross-bar, said cross-bar and links constituting means for the driver to apply lateral pressure to said pivot for causing a change in the direction of movement of the machine, and means connecting the said cross-bar and the frame and acting to normally hold the frame against lateral turning, said last-named means comprising a spring attached at its rear end to the frame and two rigid arms pivotally connected to said cross-bar at opposite sides of said vertical pivot and also connected with said spring.

9. In an agricultural implement, the combination of a wheel-supported frame, earth-engaging devices depending from the frame, a vertical pivot at the forward end of the frame, a tongue mounted on said pivot, a cross-bar fixedly connected with the tongue and movably mounted on said pivot, links extending rearwardly from opposite end portions of said cross-bar, said cross-bar and links constituting means for the driver to apply lateral pressure to said pivot for causing a change in the direction of movement of the machine, and means connecting the said cross-bar and the frame and acting to normally hold the frame against lateral turning, said last-named means comprising two arms connected with said cross-bar and converging rearwardly therefrom and a spring connecting said arms with said framework in rear thereof.

CHARLES E. WHITE.